Nov. 30, 1926.

J. C. SWEET 1,609,220

SHADE ATTACHMENT FOR HEADLIGHTS

Filed March 16, 1926

INVENTOR.

James C. Sweet,

BY

Geo. F. Kimmel, ATTORNEY

Patented Nov. 30, 1926.

1,609,220

UNITED STATES PATENT OFFICE.

JAMES C. SWEET, OF FLINT, MICHIGAN, ASSIGNOR OF FORTY-NINE ONE-HUNDREDTHS TO OSCAR M. YORK, OF FLINT, MICHIGAN.

SHADE ATTACHMENT FOR HEADLIGHTS.

Application filed March 16, 1926. Serial No. 95,121.

This invention relates to a shade attachment for headlights of automobiles, trucks or other motor driven vehicles, and has for its object to provide, in a manner as hereinafter set forth, a device of the class referred to, capable of being readily attached and positioned with respect to the lamp of a headlight and so shaped as to prevent the usual objectionable glare to the driver of a vehicle approaching from the front thereby reducing accidents to a minimum, and at the same time retain the illuminative efficiency of the headlight.

Further objects of the invention are to provide, in a manner as hereinafter set forth, a shade attachment for the purpose referred to, which is simple in its construction and arrangement, strong, durable, compact, thoroughly efficient in its use, readily installed with respect to the lamp of a headlight, and inexpensive to manufacture.

With the foregoing and other objects in view, the invention consists of the novel construction, combination and arrangement of parts as hereinafter more specifically described and illustrated in the accompanying drawings, wherein is shown embodiments of the invention, but it is to be understood that changes, variations and modifications can be resorted to which fall within the scope of the claims hereunto appended.

In the drawings wherein like reference characters denote corresponding parts throughout the several views:—

Figure 4 is a perspective view of a securing element for the shade body.

Figure 5 is a bottom plan view of the shade body and further illustrating in dotted lines the position of the securing means therefor.

Figure 6 is a top plan view of a modified form of shade attachment in accordance with this invention.

Figure 7 is a top plan view of another modified form of a shade attachment in accordance with this invention.

Figure 8 is a section on line 8—8 Figure 5.

Figure 9 is a section on line 9—9 Figure 6.

Figure 10 is a section on line 10—10 Figure 7.

Figure 1:
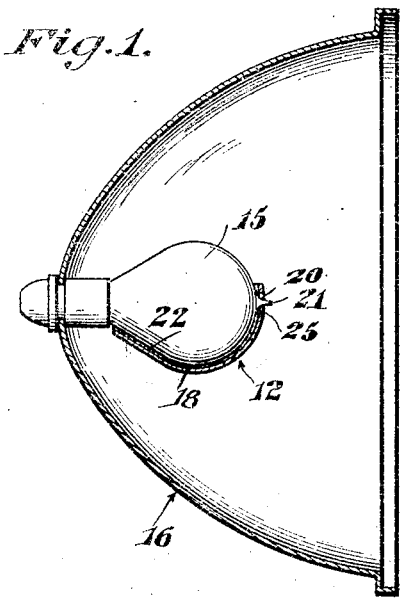
Figure 1 is a sectional elevation of a headlight showing the adaptation therewith of a shade attachment in accordance with this invention.

A shade attachment in accordance with this invention comprises a flexible shade body and means for securing it directly to the globe of a lamp of a headlight at the bottom thereof and at the lower part of the forward end of the globe and with the shade body when secured in position projecting laterally in both directions from the globe. The shade body can be formed of any suitable material, such as paper stock of appropriate thickness or from a web of paper reinforced by a length of fabric corresponding in contour to the shape of the web and secured to one or both sides of the web, or from suitable thin metallic material, or from an asbestos fabric. The shade body is of substantially pear shape and is indicated by the reference character 12 in Figures 1, 2, 3 and 5, by the reference character 13 in Figure 6 and by the reference character 14 in Figure 7. Prior to the connecting of the shade body to the globe 15 of the headlight 16 the shade body is flat. Each of the forms of shade body consists of a semi-circular portion 17 which merges into a tapered portion 18. The length of the tapered portion 18 is materially greater than the length of the semi-circular portion 17. The semi-circular portion 17 is arranged at the forward end of the shade body and is of a length less than half the length of the shade body. The tapered portion 18 projects rearwardly from the semi-circular portion 17 and is formed with a flat or squared rear edge 19. Each of the forms of shade body as illustrated is provided at the longitudinal median thereof and in close proximity to its forward edge with an opening 20 for the passage of the tip 21 at the forward end of the globe 15 and the opening 20, in connection with the tip 21 connects the forward end of the shade body to the globe 15.

Figure 2:
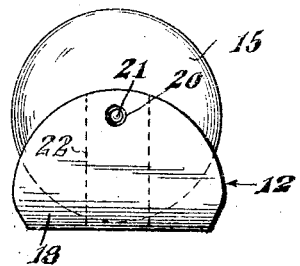
Figure 2 is a front elevation of the lamp of a headlight showing the adaptation therewith of a shade attachment in accordance with this invention.
Figure 3:
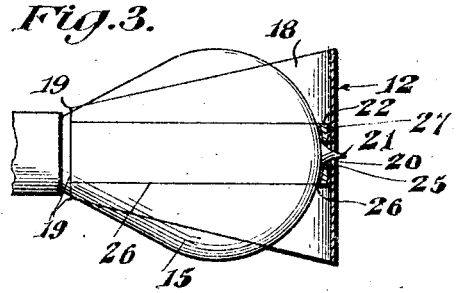
Figure 3 is a top plan view of the lamp of a headlight showing the adaptation therewith of a shade attachment in accordance with this invention, the attachment being illustrated in sectional plan.
Figure 3:
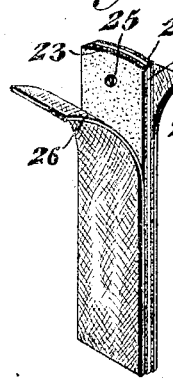
Figure 3:
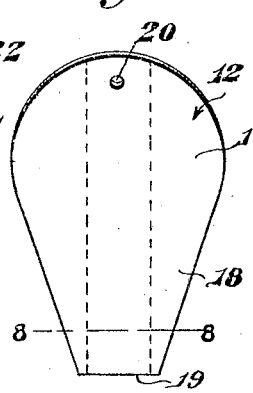
Figure 3:
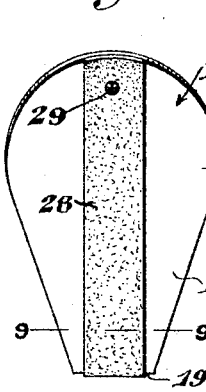
Figure 3:
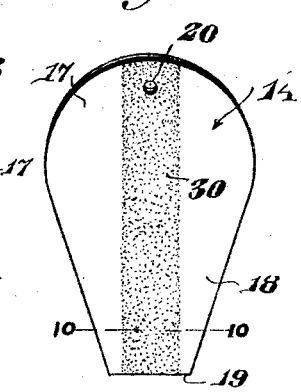
Figure 3:
Figure 3:
Figure 3:
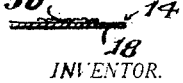

The shade body 12 is connected to the globe 15 or rather secured to the globe 15 by a coupling element formed of flexible material and of oblong contour. The coupling element is of the same length as the shade body 12 and consists of a flexible strip 22 having an adhesive coating, on each face thereof, as indicated at 23, 24. The forward edge of the coupling element conforms in shape to the forward edge of the shade body 12 and the rear edge of said element also conforms in contour to the shape of the rear edge or end of the shade body 12. The coupling element in proximity to its forward edge is provided with an opening 25 which aligns with the opening 20 in the shade body 12 so that when the latter is connected to the globe 15 the tip 21 will extend through said aligning openings. The coupling element is of material less width than the width of the shade body 12 and when the coupling element is arranged in coupling position with respect to the shade body 12 and the globe 15 it is positioned at the longitudinal median of said shade body 12. The coupling element is provided with a pair of protecting strips 26, 27 for the adhesive coating and when the coupling element is to be used the strips 26 and 27 are removed. When the coupling element is in active position the coating 24 is secured to the upper face of the shade body 12 and the coating 23 secured to the outer face of the globe 15 whereby the shade body 12 is secured to the globe 15 in a manner as illustrated in Figures 1, 2 and 3. When the shade body 12 is secured to the globe 15 through the medium of the coupling element the shade body projects laterally in both directions from the globe 15 in a manner as shown in Figures 2 and 3 of the drawings, and by this arrangement the shade attachment will prevent the usual objectionable glare and at the same time retain the illuminative efficiency of the headlight 16.

In the form shown in Figures 6 and 9, the shade body 17 is secured to the globe 15 by a coupling element consisting of a flexible strip corresponding in contour to the coupling element heretofore referred to and said strip is indicated at 27 and has its upper face provided with a coating of adhesive material 28. The strip 27 is fixedly secured to the upper face of the shade body 13 by any suitable means.

The strip 27 and adhesive coating 28 is formed with an opening 29 which registers with the opening 20 provided in the shade body 13.

In the form shown in Figures 7 and 10, the shade body 14 is provided at the longitudinal median thereof with an adhesive coating 30 of substantial width and which extends from the forward to the rear end of the shade body 14 and corresponds in width to the width of the coupling element heretofore referred to. The adhesive coating 30 provides means for securing the shade body 14 to the globe 15.

When the shade bodies 13 and 14 are secured to the globe 15 they are positioned in the manner as shown in Figures 2 and 3 with respect to the shade body 12.

It is thought the many advantages of a shade attachment, in accordance with this invention, and for the purpose set forth, can be readily understood, and although the preferred embodiments of the invention are as illustrated and described, yet it is to be understood that changes in the details of construction thereof can be had which will fall within the scope of the invention as claimed.

What I claim is:—

1. A shade attachment for headlights comprising a flexible shade body for positioning at the lower part of the forward end and at the bottom of a globe of a headlight and formed from a flat length of suitable material provided with a semicircular portion at its forward end and a tapered portion extended rearwardly from said semi-circular portion, and means for securing said shade body at the longitudinal median thereof to the outer face of the globe whereby said body will project laterally in both directions from the globe.

2. A shade attachment for headlights comprising a flexible shade body for positioning at the lower part of the forward end and at the bottom of a globe for the headlight and formed from a flat piece of suitable material provided with a semi-circular portion at its forward end and a tapered portion extended rearwardly from said semi-circular portion, and means for securing said shade body at the longitudinal median thereof to the outer face of the globe whereby said body will project laterally in both directions from the globe, said body and securing means formed at the forward end thereof with an opening for the passage therethrough of the tip at the forward end of the globe.

In testimony whereof, I affix my signature hereto.

JAMES C. SWEET.